Dec. 30, 1941.   N. O. H. STYRÉN   2,268,315
APPARATUS FOR PRODUCING MOISTENED HOT AIR FOR FINNISH BATHS
Filed May 23, 1939
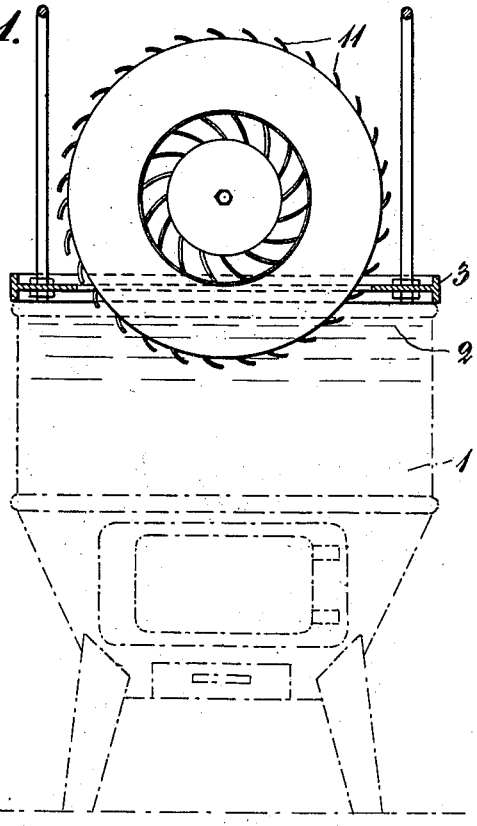
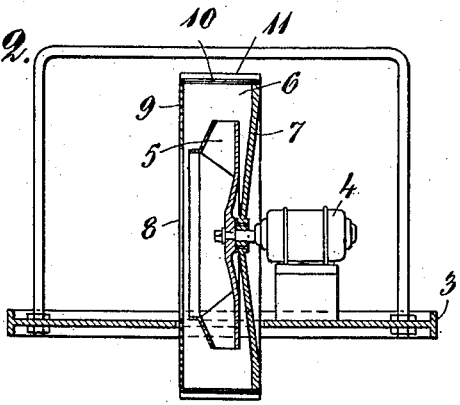

Patented Dec. 30, 1941

2,268,315

UNITED STATES PATENT OFFICE 2,268,315

APPARATUS FOR PRODUCING MOISTENED HOT AIR FOR FINNISH BATHS

Nils Olof Harry Styrén, Enkoping, Sweden, assignor to Aktiebolaget Enköpings Verkstäder, Fanna, Enkoping, Sweden Application May 23, 1939, Serial No. 275,328
In Sweden May 31, 1938

2 Claims. (Cl. 261—92)

The present invention relates to apparatus for producing moistened hot air for Finnish baths. In the methods and apparatus for this purpose as hitherto known, one would generally proceed by producing more or less dry steam by boiling at 100 degrees centigrade or more, whereupon the temperature and the increased moisture of the air would be brought about by partial condensation of the steam, or by an admixture of water. Since long ago, the steam required for the bagnio baths would be produced by pouring water on intensely heated stones or metal bodies, a portion of the water having then been explosively transformed into steam, while entraining the remaining portion of the water, without the latter having been caused to vaporize. In all of these cases, wherein steam is obtained which from the beginning has a temperature of 100 degrees centigrade or more, and the temperature of which is substantially lowered, the percentage of moisture of the steam is difficult to control to the desired value, at least without comparatively complicated apparatus.

According to the present invention, production of moistened hot air of a temperature and a percentage of moisture suited for bagnio baths is facilitated in an extremely simple and efficient manner with the aid of a very simple apparatus occupying very little space only and permitting of being arranged directly in the bagnio room proper with the use of an ordinary so-called brewer's kettle or other container for the heating of water, a suitable water container adapted to be heated for instance by means of a furnace or an electric heater.

In accordance with the invention, these objects in view are realized by air being forced or sucked through one or more layers of moistened filtering material of wire gauze or similar material of good heat conducting properties, for example, which filtering material is kept at a temperature of about 50-100 degrees centigrade, so that the water present on the filtering material on the drum will be transformed from water into steam when the air is caused to pass through the hot filtering material, without said water having in any stage of the process had a temperature of 100 degrees centigrade or more.

The apparatus suited for carrying the method into effect consists of a rotatable drum covered with filtering material, such as one or more wire nets or other material of good heating conducting properties, said drum being partly lowered into a heated body of water, and of a fan arranged within the drum, if desired, and with its intake communicating directly with the bagnio room, said fan forcing the air thus sucked in through the filtering material on the drum, which is rotated at a smaller speed than that of the fan, either by special transmission means or by the action of the air itself, in which latter case the drum is preferably provided with special turbine blades, or the filtering material is itself arranged in a manner such as to act as turbine blades.

Other features characteristic of the invention will be set forth more closely in the following in connection with the description of the embodiment of apparatus illustrated on the accompanying drawing by way of somewhat diagrammatic representation, the apparatus being viewed from two different sides in Figs. 1 and 2.

1 denotes a so-called brewer's kettle fitted with a furnace and filled with water. Arranged on the kettle is a loosely applicable cover 3 carrying an electric motor 4, on the shaft of which is rigidly arranged a radial flow fan 5 and a freely rotatable drum 6. This drum is provided with a whole head wall 7 and with a head wall 9 with a central suction opening 8 for the fan therein. These head walls carry and support a filtering material 10 forming the cylindrical peripheral portion of the drum. This filtering material is preferably constituted by wire gauze or finely perforated sheet metal. It has been found to be of special advantage to make use of one or more fine-meshed wire cloths and of one or more large-meshed wire cloths so arranged on one or both sides of the first-mentioned cloths as to be in metallic contact with this or these wire cloths as far as possible. It has been found that the best heat transfer to the air takes place through the fine-meshed wire cloth or cloths, which impart a far-carried division to the air passing forth. On the other hand, a greater heat quantity is required for proper vaporization than can be absorbed by a few fine-meshed cloths, the lacking heat quantity being then supplied in this form of embodiment by the large-meshed cloths, which successively give off the greater portion of their heat to the air over the fine-meshed cloths.

The drum 6 protrudes downwardly through an opening in the cover somewhat below the liquid level 2 in the kettle 1, so that the drum when rotated is continuously moistened and heated by the water in the kettle, which is heated to 80-100 degrees centigrade, for example. For the rotation of the drum, a transmission gear driven from the motor 4 may be made use of, such transmission gear rotating the drum at a low number of revolutions, preferably so adapted relatively to the air quantity forced through the drum that the portion of the circumference of the drum situated above the water level will be effective, entirely or for the major portion thereof, to yield steam and to heat the air. In the embodiment shown in the drawing, the driving power of the air is used for the rotation of the drum, for which purpose the drum is provided with turbine blades 11 on the outside thereof.

By the apparatus now described, a very intense production of moistened hot air of a temperature suitable for bagnio baths, 45-65 degrees centigrade, will be obtained if the water in the kettle is kept at about 80-100 degrees centigrade, this result being ascribable to the air forced through the filtering material of the drum and to the hot water taken up by the drum, as well as to the heat absorbed from the water in the kettle and stored in the filtering material. For the heating of an average-sized bagnio room, only a few minutes will elapse after the kettle water has become heated, the steam thus formed for the moistening of the hot air having been produced entirely below a temperature of 100 degrees centigrade.

By varying the air quantity, the portion of the circumference of the drum submerged into the water, the heat capacity of the filtering material relatively to the quantity of water which it is possible for the filtering material to absorb, and the temperature of the kettle water, control will be possible of the steam production, the temperature of the steam produced and of the moisture of the air in any desired manner for the purpose in consideration according to the invention. It might be pointed out in particular that it is of importance to adapt the heat capacity of the filtering material relatively to the quantity of water which the filter is capable of absorbing, in a manner such that at least 50 per cent of the heat required for the steam production be supplied through the filtering material.

Preferably, 80-90 per cent of the heat should be supplied in this manner to attain the steam production in consideration. If desired, further heating of the filtering material may take place by the fitting of suitably arranged electric heaters on the inside or the outside of the drum, or directly in the filtering material proper, in which case the water in the kettle or container may be kept lower. It is evident, also, that it is not absolutely necessary for the realization of the invention that the drum be moistened by dipping into water. The moistening may also be effected by sprinkling water or the like thereon, in which case no kettle or boiler will be required, particularly if the drum, as stated above, is itself provided with a heater or heaters. It might be pointed out, furthermore, that the drum may be mounted either on the motor shaft, as shown in the drawing, or in or on the motor casing or some other stationary or rigid part of the apparatus. In this case, too, the drum may be driven by means of a special transmission gear or, for instance, by driving power obtained from the fan air. Preferably, the fan is driven by an electric motor, but may also, to advantage, in many cases, be operated manually.

Having now particularly described the nature of my invention and the manner of its operation what I claim is:

1. Apparatus for producing moistened hot air for Finnish baths, comprising a rotatable drum provided with a heat-conductive circumference consisting of at least one layer of fine metal wire cloth and at least one layer of coarser metal wire cloth, said layers of wire cloth being arranged in metallic contact with one another, a hot water bath, into which a portion of said drum dips, a fan adapted to force a current of air through the heat conductive circumference of the drum, and means for rotating said drum at a lower velocity than the fan to continuously heat and moisten the circumference of the drum with hot water.

2. Apparatus for producing moistened hot air for Finnish baths, comprising a freely rotatable drum provided with a heat-conductive circumference consisting of at least one layer of fine metal wire cloth and at least one layer of coarser metal wire cloth, said layers of wire cloth being arranged in metallic contact with one another, a hot water bath into which a portion of said drum dips, a fan mounted within said drum and adapted to force a current of air through the heat-conductive circumference of the drum, and turbine blades arranged at the circumference of the drum and adapted to be hit by said current of air being propelled by the fan so as to rotate the drum, thereby continuously heating and moistening the circumference of the drum with hot water.

NILS OLOF HARRY STYRÉN.